(12) United States Patent
Yamaguchi et al.

(10) Patent No.: US 11,119,022 B2
(45) Date of Patent: Sep. 14, 2021

(54) OPTICAL ANALYSIS DEVICE, OPTICAL ANALYSIS METHOD, AND RECORDING MEDIUM

(71) Applicant: OLYMPUS CORPORATION, Hachioji (JP)

(72) Inventors: Mitsushiro Yamaguchi, Tokyo (JP); Tetsuya Tanabe, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 78 days.

(21) Appl. No.: 16/584,853

(22) Filed: Sep. 26, 2019

(65) Prior Publication Data

US 2020/0033247 A1    Jan. 30, 2020

Related U.S. Application Data

(63) Continuation of application No. PCT/JP2017/012573, filed on Mar. 28, 2017.

(51) Int. Cl.
*G01N 15/06* (2006.01)
*G01N 15/14* (2006.01)
(Continued)

(52) U.S. Cl.
CPC ............. *G01N 15/06* (2013.01); *G01N 15/14* (2013.01); *G01N 2015/0693* (2013.01); *G02B 26/0816* (2013.01); *G02B 26/101* (2013.01)

(58) Field of Classification Search
CPC .................. G01N 15/06; G01N 15/14; G01N 2015/0693; G02B 26/0816; G02B 26/101
See application file for complete search history.

(56) References Cited

U.S. PATENT DOCUMENTS

2008/0158561 A1    7/2008   Vacca et al.
2010/0328662 A1   12/2010   Vacca et al.
(Continued)

FOREIGN PATENT DOCUMENTS

EP    2522988 A1    11/2012
EP    2752654 A1     7/2014
(Continued)

OTHER PUBLICATIONS

International Search Report (ISR) dated Jun. 20, 2017 issued in International Application No. PCT/JP2017/012573.
(Continued)

*Primary Examiner* — Jamil Ahmed
(74) *Attorney, Agent, or Firm* — Holtz, Holtz & Volek PC

(57) ABSTRACT

An optical analysis device includes a light source, a beam shaping unit, a relative movement unit, a photodetector, and a position detector. The light source unit generates a light beam. The beam shaping unit forms a flat beam portion. The relative movement unit is configured to cause the flat beam portion and a test sample including marker particles to relatively move in a minor axis direction of the flat beam portion. The photodetector is configured to detect a light intensity and a light emitting position in a plane orthogonal to the minor axis direction. The position detector is capable of detecting spatial positions of the marker particles on the basis of information on a relative movement amount of the flat beam portion, information on the light intensity and the light emitting position, and a change of the light intensity generated according to a relative movement of the flat beam portion.

20 Claims, 9 Drawing Sheets

(51) Int. Cl.
 *G02B 26/08* (2006.01)
 *G02B 26/10* (2006.01)

(56) References Cited

U.S. PATENT DOCUMENTS

| | | |
|---|---|---|
| 2011/0228271 A1 | 9/2011 | Vacca et al. |
| 2012/0318956 A1* | 12/2012 | Yamaguchi ........ G02B 21/0076 250/203.3 |
| 2013/0229494 A1* | 9/2013 | Dyba .................. G02B 21/367 348/47 |
| 2014/0175262 A1 | 6/2014 | Nakata et al. |
| 2016/0313548 A1 | 10/2016 | Fujii |

FOREIGN PATENT DOCUMENTS

| | | |
|---|---|---|
| JP | H05223738 A | 8/1993 |
| JP | 2010515055 A | 5/2010 |
| JP | 2013057938 A | 3/2013 |
| JP | 5250152 B2 | 7/2013 |
| JP | 2016206652 A | 12/2016 |
| WO | 2008082813 A1 | 7/2008 |
| WO | 2011108369 A1 | 9/2011 |
| WO | 2013031377 A1 | 3/2013 |

OTHER PUBLICATIONS

Written Opinion dated Jun. 20, 2017 issued in International Application No. PCT/JP2017/012573.

Huang B. et al., "Three-Dimensional Super-Resolution Imaging by Stochastic Optical Reconstruction Microscopy," Science, Feb. 8, 2008, vol. 319, pp. 810-813.

* cited by examiner

OPTICAL ANALYSIS DEVICE, OPTICAL ANALYSIS METHOD, AND RECORDING MEDIUM

The application is a continuation application based on a PCT Patent Application No. PCT/JP2017/012573, filed Mar. 28, 2017. The content of the PCT Application is incorporated herein by reference.

The present invention relates to an optical analysis device, an optical analysis method, and a recording medium.

DESCRIPTION OF RELATED ART

For example, an optical analysis device for measuring a concentration and the like of a dilute solution with high accuracy is known. For example, in Japanese Patent No. 5250152, an optical analysis device that counts molecules by irradiating solution molecules with light emitting particles attached with a laser light and detecting emitted light from the light emitting particles is proposed. Here, the "light emitting particles" emit light by being excited by irradiation of a laser light. Because of confusion with self-luminous particles, hereinafter, the "light emitting particles" are referred to as marker particles.

SUMMARY OF THE INVENTION

An optical analysis device of a first aspect of the present invention includes a light source unit configured to generate a light beam which causes marker particles to emit light, a beam shaping unit configured to form a flat beam portion with to at least a portion of the light beam, a relative movement unit configured to cause the flat beam portion and a test sample including the marker particles to relatively move in a minor axis direction of the flat beam portion by moving at least one of the flat beam portion and the test sample, a photodetector disposed to face the flat beam portion in the minor axis direction and is configured to detect a light intensity of emitted light in the test sample and a light emitting position of the emitted light in a plane orthogonal to the minor axis direction, and a position detector capable of detecting spatial positions of the marker particles in the test sample on the basis of information on a relative movement amount of the flat beam portion obtained by the relative movement unit, information on the light intensity and the light emitting position obtained by the photodetector, and a change of the light intensity at the light emitting position generated according to a relative movement of the flat beam portion.

An optical analysis method of a second aspect of the present invention includes irradiating an inside of a test sample including marker particles caused to emit light by a light beam with the light beam having a flat beam portion, causing the flat beam portion to relatively move in a minor axis direction of the flat beam portion with respect to the test sample, detecting a light intensity of the light emitted from the test sample and a light emitting position of the emitted light in a plane orthogonal to the minor axis direction during a relative movement of the flat beam portion in the minor axis direction, and detecting spatial positions of the marker particles in the test sample on the basis of a relative movement amount of the flat beam portion, the light intensity and the light emitting position, and a change of the light intensity at the light emitting position generated according to a relative movement of the flat beam portion.

A non-transitory computer-readable recording medium of a third aspect of the present invention stores a program fort causing a computer to execute a first step of acquiring light intensity distribution data in a plane viewed from a minor axis direction, which is acquired by scanning a flat beam portion in the minor axis direction of the flat beam portion in a test sample including marker particles caused to emit light by a light beam, a second step of acquiring one-dimensional time-series data with fixed position coordinates in the plane from the light intensity distribution data, a third step of performing correction processing on the time-series data at the position coordinates on the basis of a light intensity profile of the flat beam portion, and a fourth step of estimating spatial positions of the marker particles according to the corrected time-series data.

DETAILED DESCRIPTION OF THE INVENTION

Figure 1:
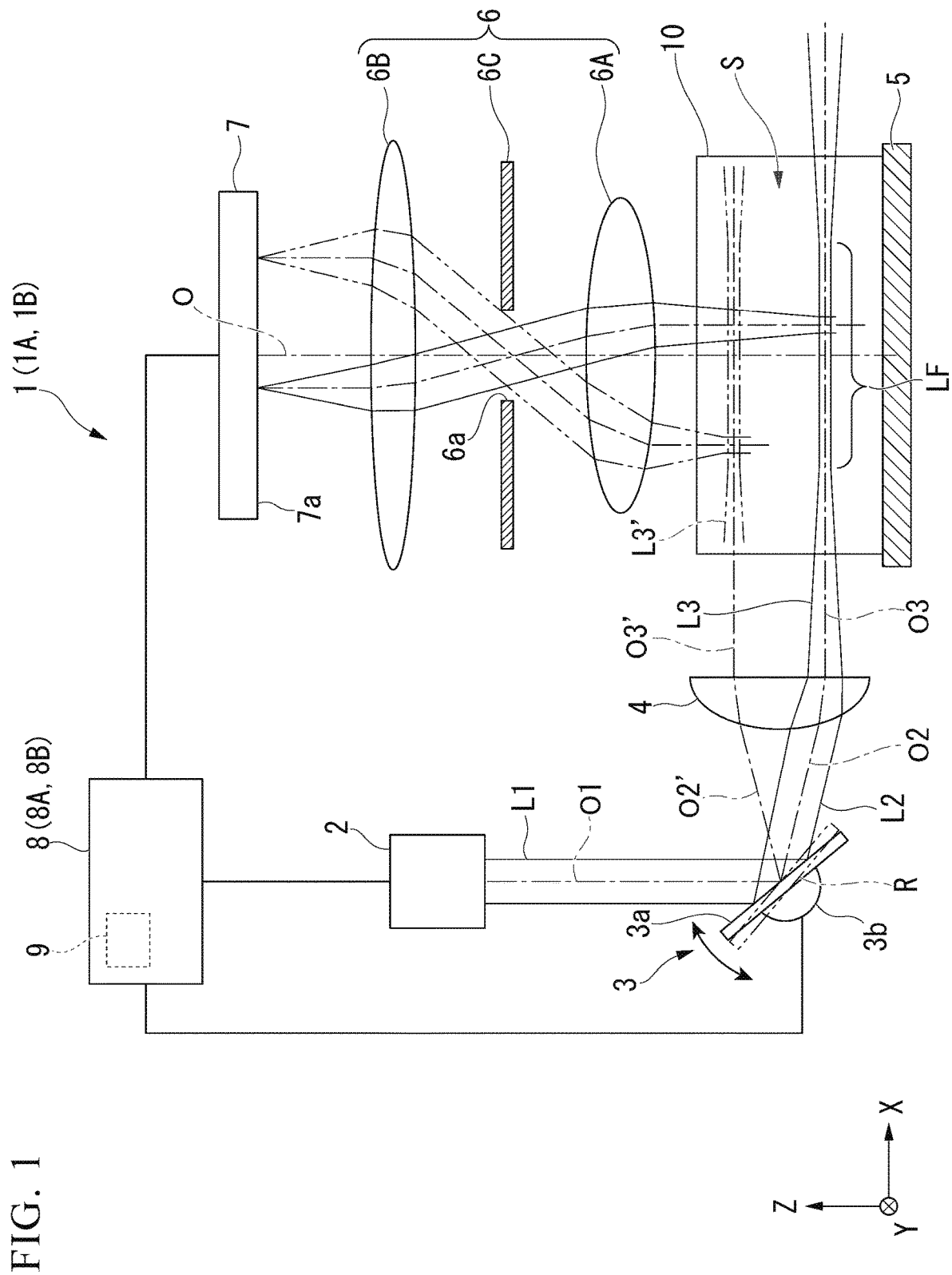
FIG. 1 is a schematic configuration diagram which shows an example of an optical analysis device according to a first embodiment of the present invention.

Hereinafter, embodiments of the present invention will be described with reference to the attached drawings. In all the drawings, although embodiments are different, the same or corresponding members will be denoted by the same reference numerals, and common description thereof will be omitted.

First Embodiment

An optical analysis device according to a first embodiment of the present invention will be described.

Figure 2:
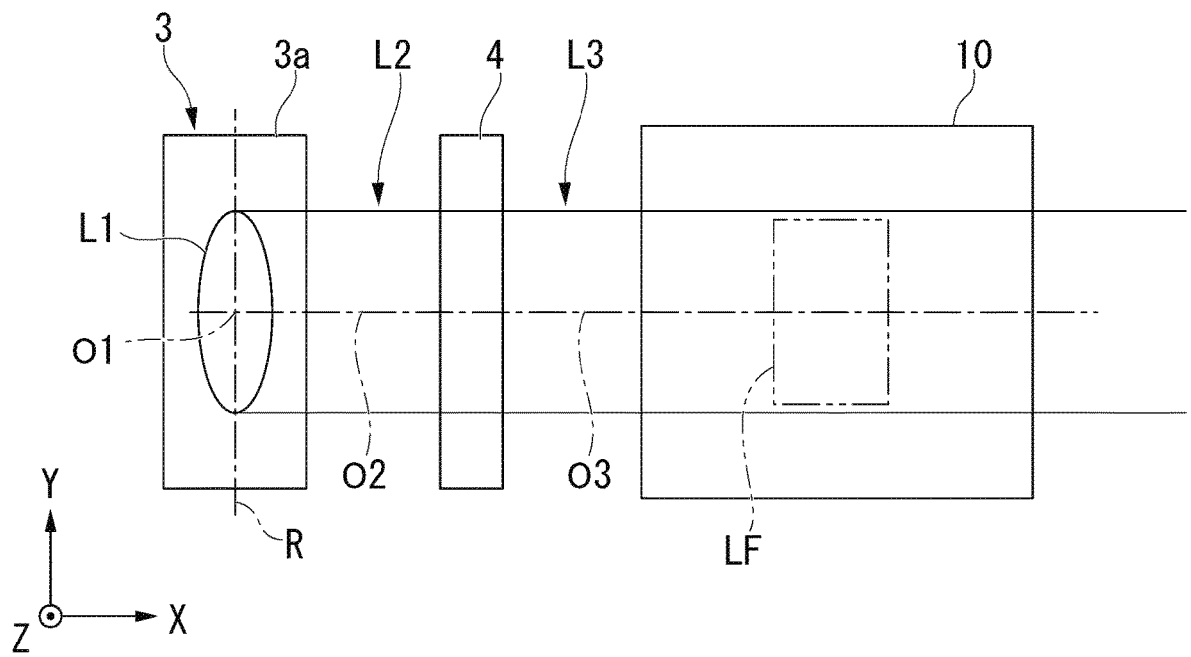
FIG. 2 is a schematic plan view of a flat beam portion in the optical analysis device according to the first embodiment of the present invention.
Figure 3:
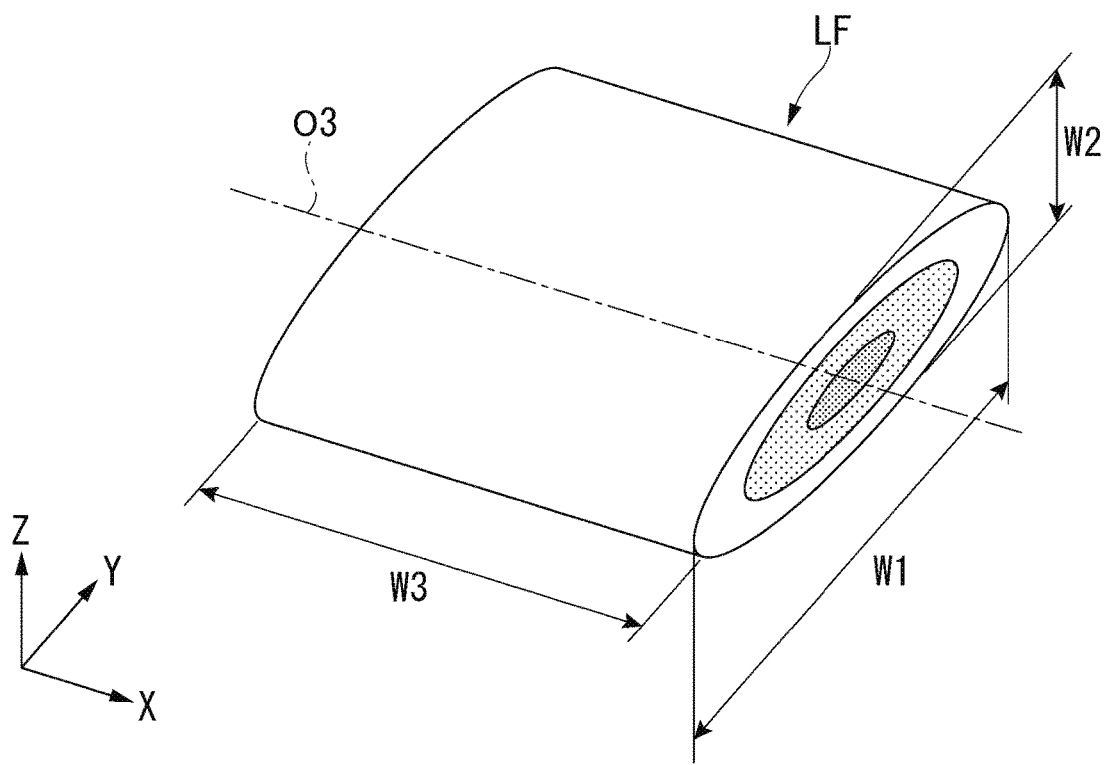
FIG. 3 is a schematic perspective view of the flat beam portion in the optical analysis device according to the first embodiment of the present invention.
Figure 4:
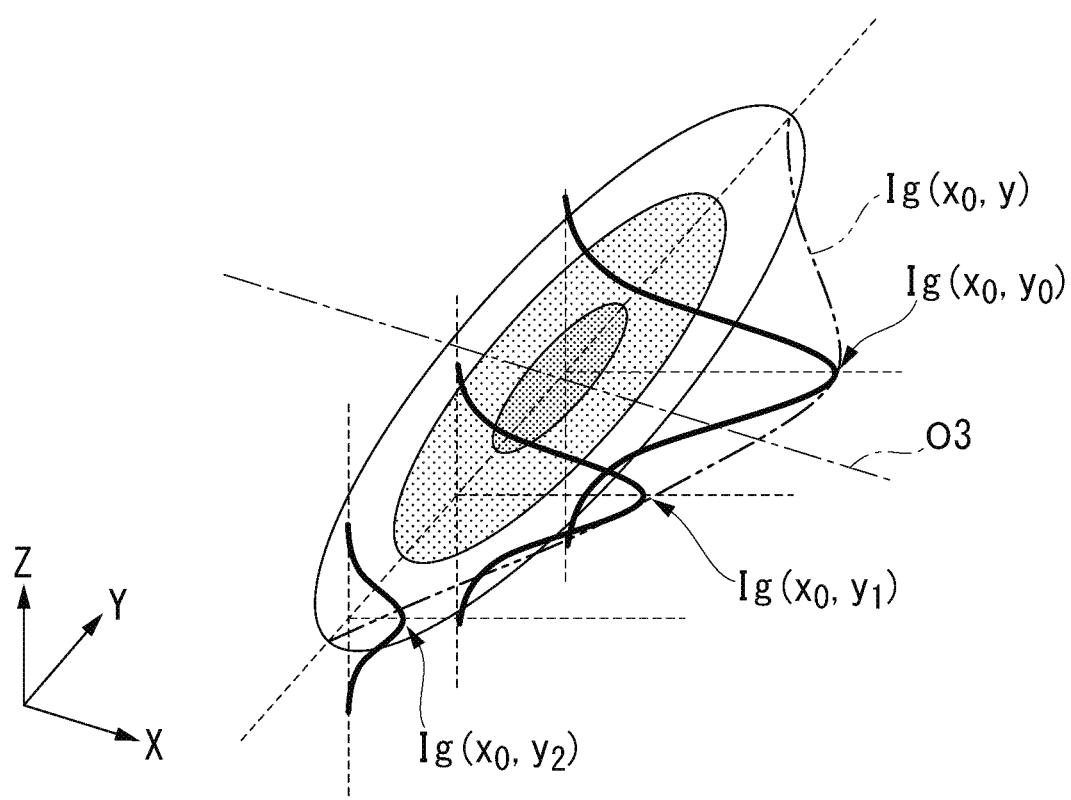
FIG. 4 is a schematic diagram which shows an example of a light intensity profile of the flat beam portion in the optical analysis device according to the first embodiment of the present invention.

FIG. 1 is a schematic cross-sectional view which shows an example of an optical analysis device according to a first embodiment of the present invention. FIG. 2 is a schematic plan view of a flat beam portion in the optical analysis device according to the first embodiment of the present invention. FIG. 3 is a schematic perspective view of the flat beam portion in the optical analysis device according to the first embodiment of the present invention. FIG. 4 is a schematic diagram which shows an example of a light intensity profile of the flat beam portion in the optical analysis device according to the first embodiment of the present invention.

The optical analysis device 1 of the present invention shown in FIG. 1 analyzes a sample 10 (test sample) by irradiating the sample 10 with light. The sample 10 is not particularly limited as long as it includes marker particles and has an optical transparency that allows the marker particles to be irradiated with light. For example, the sample 10 may be configured by a sample solution S in which marker particles themselves or substances to which marker particles are attached are dispersed, and a transparent body that holds the sample solution S.

The substances contained in the sample solution S include, for example, biomolecules such as proteins, peptides, nucleic acids, lipids, sugar chains, or amino acids, aggregates of these biomolecules, and particulate biological objects such as viruses and cells. The substances contained in the sample solution S may be, for example, non-biological particles such as atoms, molecules, micelles, and metal colloids.

As the marker particles contained in the sample solution S, appropriate particles that emit light according to excitation light are used. Examples of the marker particles include particles to which a light-emitting label such as a fluorescent dye is added, fluorescent particles, and the like.

The marker particles may be dispersed or may be dissolved in the sample solution S.

The optical analysis device 1 of the present embodiment includes a light source unit 2, a beam deflector 3 (relative movement unit), a beam shaping unit 4, a sample holding unit 5, a telecentric optical system 6, an imaging unit 7 (photodetector), and a controller 8.

The light source unit 2 generates a light beam L1 that is an excitation light which causes the marker particles to emit light. The light beam L1 is, for example, a collimated parallel beam.

A wavelength of the light beam L1 is not particularly limited as long as a wavelength for exciting the marker particles included in the sample 10 is included. For example, when a plurality of types of marker particles having different excitation wavelengths are included in the sample solution S, the light beam L1 may include a plurality of peak wavelengths.

In the following description, as an example, it is assumed that an excitation light wavelength of the marker particles is $\lambda$. In this case, it is more preferable that the wavelength distribution of the light beam L1 have a peak wavelength of $\lambda$. However, the wavelength distribution of the light beam L1 may have a peak wavelength shifted from the wavelength $\lambda$ as long as it has a stable light intensity at the wavelength $\lambda$.

For example, as the light beam L1, a laser light having a peak wavelength at or near the wavelength $\lambda$ may be used.

The light source unit 2 includes, for example, at least an appropriate light source for generating the light beam L1 such as a laser light source. The light source unit 2 may further include an optical system for obtaining a parallel beam having an appropriate beam diameter when necessary.

The light source unit 2 is communicatively connected to a controller 8 to be described. In the light source unit 2, ON/OFF of the light beam L1 and light intensity of the light beam L1 are controlled according to a control signal from the controller 8.

The light beam L1 generated by the light source unit 2 is emitted toward the beam deflector 3 along an optical axis O1.

In the following description, for a sake of simplicity, an XYZ orthogonal coordinate system described in FIG. 1 may be referred to. A Z axis is an axis parallel to the optical axis O1. An X axis is an axis orthogonal to the Z axis. A Y axis is an axis orthogonal to the Z axis and the X axis. In a disposition example shown in FIG. 1, as an example, the Z axis is a vertical axis, and an XY plane is a horizontal plane. A positive direction of the Z axis is a direction from the bottom to the top in FIG. 1. A positive direction of the X axis is a direction from the left to the right in FIG. 1. A positive direction of the Y axis is a direction from the front side of a page to the back side of the page in the drawing.

For a beam diameter of the light beam L1, an appropriate value in accordance with a size required for a flat beam portion LF to be described below is used. For example, the light beam L1 may be a circular beam. The beam diameter of the circular beam may be set to 1000 μm.

The beam deflector 3 repeatedly deflects the optical axis O1 of the light beam L1. Specifically, the beam deflector 3 reflects the optical axis O1 in a ZX plane. The device configuration of the beam deflector 3 is not particularly limited as long as the light beam L1 can be repeatedly deflected. In the example shown in FIG. 1, a galvano scanner is used as the beam deflector 3.

The beam deflector 3 includes a galvano mirror having a deflection surface 3a that reflects the light beam L1, and a drive unit 3b that causes the galvano mirror to oscillate about a rotation center axis R.

As the drive unit 3b, for example, a known galvano motor may be used. As an example, the rotation center axis R is parallel to the Y axis. The deflection surface 3a is configured from a plane reflection surface including the rotation center axis R.

The beam deflector 3 is communicatively connected to a controller 8 to be described below. In the drive unit 3b of the beam deflector 3, ON or OFF of oscillation is controlled by a control signal from the controller 8. An oscillation operation and an oscillation frequency of the beam deflector 3 may be fixed. The oscillation operation and the oscillation frequency of the beam deflector 3 may be controlled by the controller 8.

If the deflection surface 3a of the beam deflector 3 oscillates, the optical axis O1 is reflected like the optical axis O2 in the ZX plane shown in FIG. 1. For this reason, the light beam L1 travels along the optical axis O2 as the light beam L2 that is a parallel beam having a different traveling direction.

The beam diameter in a direction (scanning direction) orthogonal to the optical axis O2 in the ZX plane in the light beam L2 is the same as a beam diameter in the X axis direction in the light beam L1. The beam diameter in a direction (Y-axis direction) orthogonal to the scanning direction in the light beam L2 is the same as the beam diameter in a Y-axis direction in the light beam L1.

For example, if a position of the deflection surface 3a changes like a two-dot dashed line, the optical axis O1 is reflected in a direction in accordance with an angle change of the deflection surface 3a like an optical axis O2'.

In the example shown in FIG. 1, the beam deflector 3 can repeatedly deflect the light beam L1 that is an incident light on the deflection surface 3a around the X axis.

The beam shaping unit 4 is a device portion that forms the flat beam portion LF from the light beam L2.

The flat beam portion LF represents a beam-shaped portion in which a beam diameter of a cross-section (hereinafter, referred to as a beam cross-section) orthogonal to the optical axis is greatly different in a biaxial direction. A direction in which the maximum beam diameter is obtained in a beam cross-section is referred to as a major axis direction. A direction orthogonal to the major axis direction in the beam cross-section is referred to as a minor axis direction.

In the flat beam portion LF, if a major axis beam diameter W1 in the major axis direction and a minor axis beam diameter W2 in the minor axis direction are set, the minor axis beam diameter W2 is at least larger than a size of the marker particles. It is more preferable that the major axis beam diameter W1 be set to a value as large as possible to widen a measurement area. For example, the major axis beam diameter W1 may be equal to or larger than 500 μm and equal to or less than 2000 μm. It is more preferable that the major axis beam diameter W1 be equal to or larger than 1000 μm and equal to or less than 2000 μm.

For example, the minor axis beam diameter W2 may be equal to or larger than 5 μm and equal to or less than 20 μm. It is more preferable that the minor axis beam diameter W2 be equal to or larger than 10 μm and equal to or less than 20 μm.

For example, a ratio W1/W2 of the major axis beam diameter W1 to the minor axis beam diameter W2 may be 25 or more and 400 or less. It is more preferable that W1/W2 be 50 or more and 200 or less.

The major axis beam diameter W1, the minor axis beam diameter W2, and the ratio W1/W2 in the flat beam portion LF may be constant or changed in a direction along the optical axis of the flat beam portion LF. Hereinafter, the direction along the optical axis may be referred to as an optical axis direction.

It is more preferable that a change in width of the major axis beam diameter W1 in the flat beam portion LF be 0 μm or more and 100 μm or less. Alternatively, the change in width of the major axis beam diameter W1 in the flat beam portion LF may be equal to or less than 10% with respect to a minimum value of W1. It is more preferable that a change in width of the minor axis beam diameter W2 in the flat beam portion LF be 0 μm or more and 1 μm or less. Alternatively, the change in width of the minor axis beam diameter W2 in the flat beam portion LF may be equal to or less than 10% with respect to a minimum value of W2. It is more preferable that a change in width with respect to the ratio W1/W2 in the flat beam portion LF be equal to or less than 10% with respect to a minimum value of W1/W2.

As described below, as a length W3 of the flat beam portion LF in the optical axis direction becomes longer, the measurement area is enlarged. If the measurement area is a wide range, a measurement time is shortened. It is preferable that the length W3 be longer. However, the length W3 does not need to exceed a size of the sample 10.

For example, the length W3 may be 100 μm or more and 500 μm or less. It is more preferable that the length W3 be 200 μm or more and 500 μm or less.

The flat beam portion LF may be formed using a parallel beam. The flat beam portion LF may be formed by a portion of a convergent beam or divergent beam. Any flat beam portion LF can be formed by an appropriate optical system which shapes the light beam L2.

In the present embodiment, as an example of the beam shaping unit 4, a cylindrical lens which converges the light beam L2 only in the Z axis direction is used. In a disposition of the beam shaping unit 4 in FIG. 1, a lens optical axis of the beam shaping unit 4 is parallel to the X axis. A generatrix of a cylindrical surface of the beam shaping unit 4 extends in the Y axis direction. A position of a front focal point in the ZX plane of the beam shaping unit 4 coincides with the rotation center axis R.

When the light beam L2 reflected by the deflection surface 3a is incident on the beam shaping unit 4 disposed in this manner, a light beam L3 is emitted from the beam shaping unit 4 in the positive direction of the X axis.

Since the light beam L2 is reflected at the position of the front focal point of the beam shaping unit 4, the light beam L3 has an optical axis O3 parallel to the X axis. Since the beam shaping unit 4 has optical power in the Z axis direction, the light beam L3 is converged in the Z axis direction by the beam shaping unit 4. The light beam L3 has a beam waist in the X axis at a position of a back focal point of the beam shaping unit 4.

Since the beam shaping unit 4 does not have optical power in the Y axis direction, the light beam L3 is a parallel beam similar to the light beam L2 in the Y axis direction as shown in FIG. 2.

The light beam L3 has a flat portion in front and back of the beam waist in the X axis direction.

The range of the flat portion in the light beam L3 is defined by, for example, optical conditions such as a wavelength of the light beam L3, a beam diameter of the light beam L2 in the Y axis direction, and a focal length of the beam shaping unit 4.

For example, if the wavelength of the light beam L2 is 633 nm, the beam diameter in the Y axis direction is 1000 μm, and the focal length of the beam shaping unit 4 is 50 mm, the beam waist diameter of the light beam L3 is 1000 μm in the Y axis direction and is 10 μm in the Z axis direction. For example, the length thereof in the X axis direction is 110 μm in a range in which the beam diameter in the Z axis direction is 10 μm or more and 10.9 μm or less.

In this case, in a range of ±55 μm before and after a beam waist of the light beam L3, a flat beam portion LF having a major axis beam diameter of 1000 μm and a minor axis beam diameter of 10 μm to 10.9 μm is formed.

As shown in FIG. 3, in the flat beam portion LF, the Y axis direction is a major axis direction and the Z axis direction is a minor axis direction. When the light beam L1 is a laser light, the light beam L3 and the flat beam portion LF are regarded approximately as a Gaussian beam.

In a case of the Gaussian beam, as schematically shown in FIG. 4, all light intensity profiles in a cross-section parallel to the optical axis O3 have a Gaussian distribution. However, as a cross-sectional position becomes further away from the optical axis O3, an intensity peak is lowered and a distribution range is also narrowed.

FIG. 4 shows a change in the light intensity profile when the position in the Y axis direction is changed. For example, the light intensity profile in a cross-section parallel to the ZX plane at a position at which a Y coordinate is y in a beam cross-section where an X coordinate is x is expressed by a Gaussian distribution function $I_g(x,y)$.

For example, when an X coordinate on the optical axis O3 is set to $x_0$, a Y coordinate is $y_0$, and Y coordinates sequentially spaced apart are set to $y_1$ and $y_2$ in a negative direction of the Y axis direction, peak intensities at each position $I_g(x_0,y_0)$, $I_g(x_0,y_1)$, and $I_g(x_0,y_2)$ follow $I_g(x_0,y)$ (refer to the two-dot dashed line in FIG. 4) which is a light intensity profile of a Gaussian distribution in the X axis direction, respectively.

As shown in FIG. 1, for example, when the light beam L2 is incident on the beam shaping unit 4 along an optical axis O2' different from the optical axis O2 due to oscillation of the deflection surface 3a, a light beam L3' is emitted from the beam shaping unit 4. The light beam L3' has an optical axis O3' parallel to the X axis. The light beam L3' is converged such that a beam waist in the X axis direction is formed at a back focal plane of the beam shaping unit 4. For this reason, according to the light beam L3', a flat beam portion LF similar to the light beam L3 is formed on the optical axis O3'. The flat beam portion LF moves parallelly in the Z axis direction by the oscillation of the deflection surface 3a. The beam deflector 3 constitutes a relative movement unit which causes the flat beam portion LF to relatively move in the minor axis direction of the flat beam portion LF with respect to the sample 10 when the position of the sample 10 is fixed.

The movement speed of the flat beam portion LF in the Z axis direction (hereinafter, a movement speed) may be an appropriate movement speed in accordance with a purpose of measurement. It is more preferable that the movement speed be constant, but the movement speed may change if a moving position can be detected.

However, it is more preferable that the movement speed of the flat beam portion LF be higher than movement speeds of the marker particles or the substances to which the marker particles are attached in the sample solution S. The marker particles or the substances to which the marker particles are attached in the sample solution S randomly move due to, for example, a Brownian motion. For this reason, it is more preferable that the movement speed of the flat beam portion LF be higher than a diffusion rate of the marker particles or the substances to which the marker particles are attached in the sample solution S due to the Brownian motion.

The sample holding unit 5 is a device portion on which the sample 10 is placed on the positive side of the beam shaping unit 4 in the X axis direction. The sample holding unit 5 is disposed at a position on which the sample 10 can be placed in a movement range of the flat beam portion LF in the Z axis direction.

The telecentric optical system 6 is provided to acquire weak light from the marker particles of the sample 10 with high accuracy.

The telecentric optical system 6 includes an objective lens 6A, an aperture 6C, and an imaging lens 6B. The optical axis of the telecentric optical system 6 is disposed in parallel to the minor axis of the flat beam portion LF.

The objective lens 6A is disposed at a position where an area in which the flat beam portion LF is formed comes into depth of focus of the objective lens 6A on object side.

The aperture 6C has an opening 6a that opens at around a position conjugated with the front focal point of the objective lens 6A.

The imaging lens 6B forms an image of light collected by the objective lens 6A and passing through the opening 6a on an image surface.

The magnification of an imaging optical system configured from the objective lens 6A and the imaging lens 6B is set according to a resolution of an imaging unit 7 to be described below.

The imaging unit 7 is a photodetector which detects the light intensity of emitted light generated by the marker particles passing through the flat beam portion LF, and the light emitting position of the emitted light in a plane orthogonal to the minor axis direction of the flat beam portion LF. In the present embodiment, the plane orthogonal to the minor axis direction of the flat beam portion LF is a plane parallel to the XY plane.

The imaging unit 7 is configured from an image sensor formed of, for example, CCD or CMOS sensor, and the like. The imaging surface 7a of the imaging unit 7 is disposed on an image surface of the telecentric optical system 6.

The number of pixels of the imaging unit 7 is appropriately set in accordance with the area of the flat beam portion LF viewed in the minor axis direction, the required detection resolution of a light amount and the light emitting position, and the magnification of the telecentric optical system 6.

For example, if the range of W1×W3 is 1000 μm×200 μm, and the detection position resolution is set to 1 μm. For example, if an image sensor with a pixel size of 6.45 μm×6.45 μm is used as the imaging unit 7, an imaging magnification of the telecentric optical system 6 may be set to 6. In this case, the imaging unit 7 may have an effective image area larger than 1344 pixels×256 pixels. When the imaging unit 7 has a wider effective image area, the imaging magnification of the telecentric optical system 6 is further improved, and thereby it is possible to improve the detection resolution of a light emitting position or the detection resolution of a light amount.

The imaging unit 7 is communicatively connected to a controller 8 to be described below. The imaging unit 7 sends a captured image signal to the controller 8 in accordance with a control signal from the controller 8.

Next, a functional configuration of the controller 8 that controls an operation of the optical analysis device 1 will be described.

Figure 5:
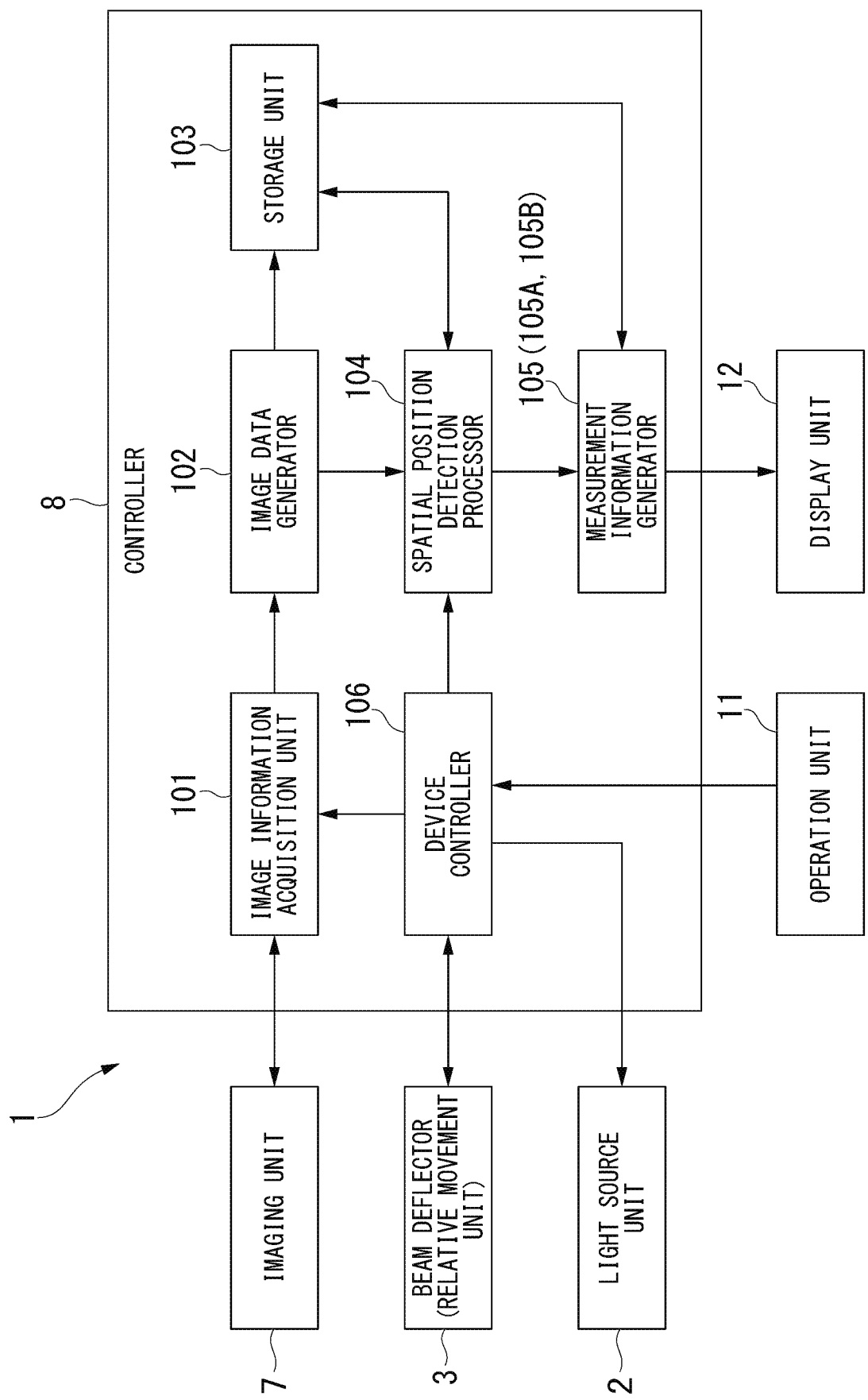
FIG. 5 is a block diagram which shows a configuration of a controller in the optical analysis device according to the first embodiment of the present invention.

FIG. 5 is a block diagram which shows a configuration of a controller in the optical analysis device according to the first embodiment of the present invention.

As shown in FIG. 5, the controller 8 includes a device controller 106, an image information acquisition unit 101, an image data generator 102, a storage unit 103, a spatial position detection processor 104 (position detector), and a measurement information generator 105.

The device controller 106 controls an overall operation of the optical analysis device 1. The device controller 106 is communicatively connected to the light source unit 2, the beam deflector 3, the image information acquisition unit 101, and the spatial position detection processor 104. Furthermore, the device controller 106 is communicatively connected to the operation unit 11.

The operation unit 11 is a device portion on which an operation input is performed by an operator who operates the optical analysis device 1. For example, the operation unit 11 is configured by appropriate operation input units such as a keyboard, a touch panel, and an operation button.

Examples of an operation input that can be input through the operation unit 11 include, for example, activation or stopping of the optical analysis device 1, a start or end of measurement, an input of conditions of measurement, and the like.

The device controller 106 controls an operation of the optical analysis device 1 on the basis of an operation input through the operation unit 11. Details of specific control performed by the device controller 106 will be described below together with the operation of the optical analysis device 1.

For example, the device controller 106 controls the light source unit 2 such that the light source unit 2 is lighted with a predetermined light intensity.

For example, the device controller 106 sets a movement range and a movement speed (an oscillation speed of the beam deflector 3) in the Z axis direction of the flat beam portion LF on the basis of an operation input from the operation unit 11. The device controller 106 controls an operation of the beam deflector 3 such that the flat beam portion LF moves in the Z axis direction at the set movement speed in the set movement range.

Furthermore, the device controller 106 controls an acquisition timing of image information from the imaging unit 7. The device controller 106 sends the image information and information on a relative movement amount of the flat beam portion LF to the spatial position detection processor 104 on the basis of the acquisition timing of image data.

The image information acquisition unit 101 acquires two-dimensional image information in the imaging range from the imaging unit 7 on the basis of a control signal from the device controller 106. The acquired image information is sent to the image data generator 102.

The image data generator 102 generates image data representing a light intensity distribution in the imaging range from the image information sent from the image information acquisition unit 101. The image data generator 102 causes the storage unit 103 to store the image data.

The image data generator 102 notifies the spatial position detection processor 104 that generation of the image data for an analysis has ended when image acquisition from the image information acquisition unit 101 ends.

The spatial position detection processor 104 calculates position coordinates (passing positions) of the marker particles on an XY plane and a light emission intensity of each marker particle on the basis of the image data stored in the storage unit 103. The spatial position detection processor 104 generates time-series data of a light emission intensity at each passing position of the marker particles.

Furthermore, the spatial position detection processor 104 estimates position coordinates of the flat beam portion LF in a scanning direction (the Z axis direction) and a light emission intensity on the basis of the time-series data.

The spatial position detection processor 104 causes the storage unit 103 to store the light emission intensity and the spatial position coordinates of marker particles in the sample 10 on the basis of a result of the operation processing described above when necessary.

The measurement information generator 105 generates measurement information on the basis of the light emission intensity and the spatial position coordinates of marker particles sent from the spatial position detection processor 104.

The measurement information generated by the measurement information generator 105 includes, for example, the number of marker particles, a concentration and a volume of a substance to which marker particles are attached, a distance between different marker particles, and the like. The measurement information is not limited to numerical information. For example, when the number of marker particles attached is changed in accordance with a type of a material contained in the sample solution S, a type of a substance is identified as measurement information according to information on the number of marker particles in a volume range of the substance. For example, when information on a relationship between the volume of a substance and the type of a substance is given in advance, the type of a substance is identified as measurement information from the information on the volume of a substance.

The measurement information generator 105 is communicatively connected to a display unit 12. The measurement information generator 105 causes the display unit 12 to display measurement information by converting the measurement information into display information on the display unit 12.

Examples of the display unit 12 include, for example, a display, a printer, and the like.

The controller 8 may be configured from appropriate hardware including a computer having a CPU, a memory, an input/output interface, an external storage device, and the like. The computer used for the controller 8 may execute a program by reading the program in a memory from the storage medium 9 (refer to FIG. 1) in which the program for realizing at least a part of control functions described above or to be described below is recorded.

The storage medium 9 is a computer-readable recording medium. For example, examples of the non-transitory storage medium 9 include a portable medium such as a flexible disk, a magneto-optical disc, or a ROM, a CD-ROM, and a storage device such as a hard disk embedded in a computer system.

Furthermore, the "computer-readable recording medium" may be a medium that dynamically holds a program for a short period of time like a communication line when a program is transmitted via a network such as the Internet or a communication line such as a telephone line. In this case, the "computer-readable recording medium" includes a medium that holds a program for a certain period of time like a volatile memory in a computer system that is a server or client.

The program may realize the control functions, described above or to be described below in combination with a program recorded in the computer.

Next, the operation of the optical analysis device 1 will be described mainly focusing on an optical analysis method of the present embodiment.

Figure 6:
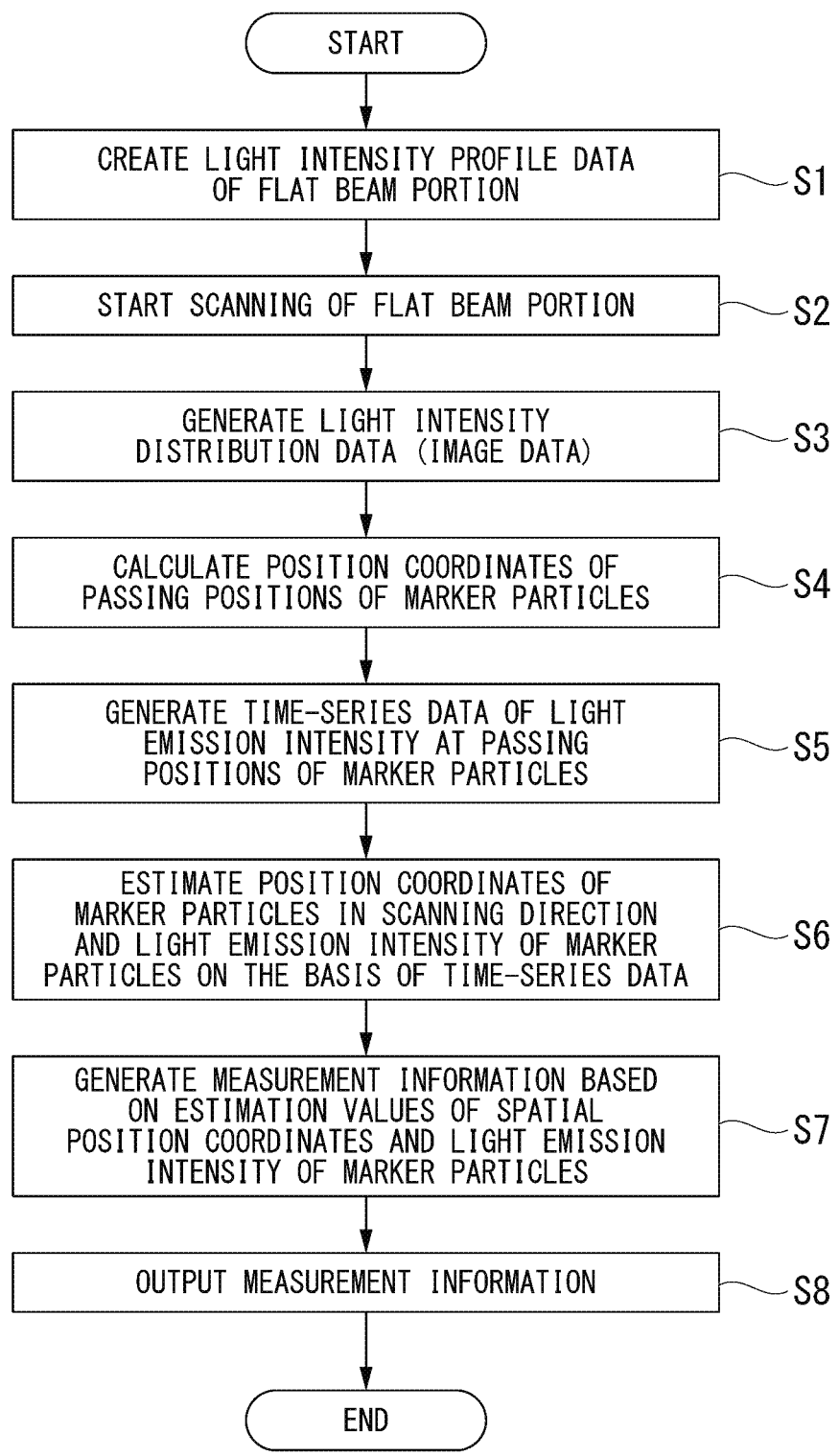
FIG. 6 is a flowchart which shows an operation example of the optical analysis device according to the first embodiment of the present invention.
Figure 7:
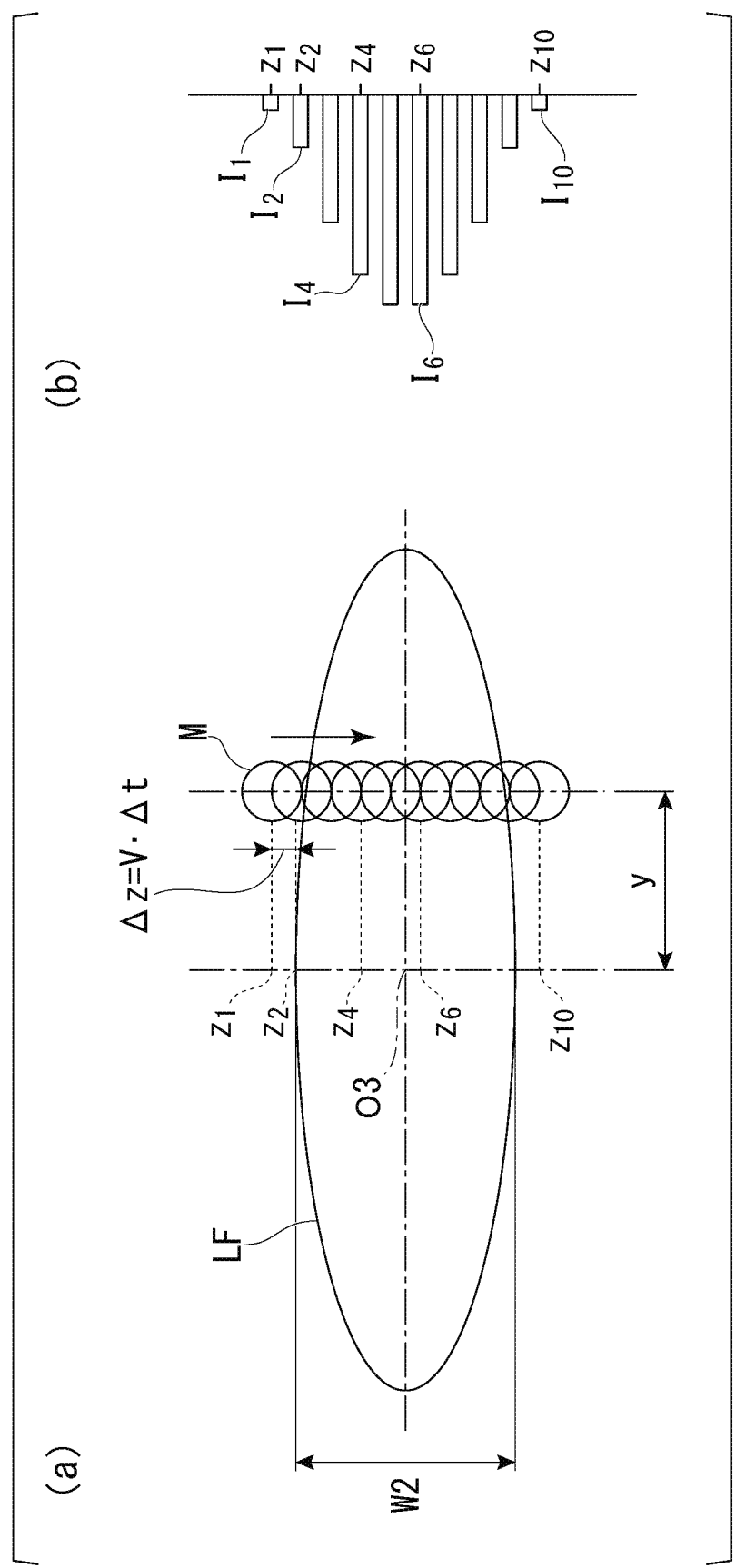
FIG. 7 is a schematic diagram and a graph which show an example of a time-series luminance distribution in an optical analysis method according to the first embodiment of the present invention.
Figure 8:
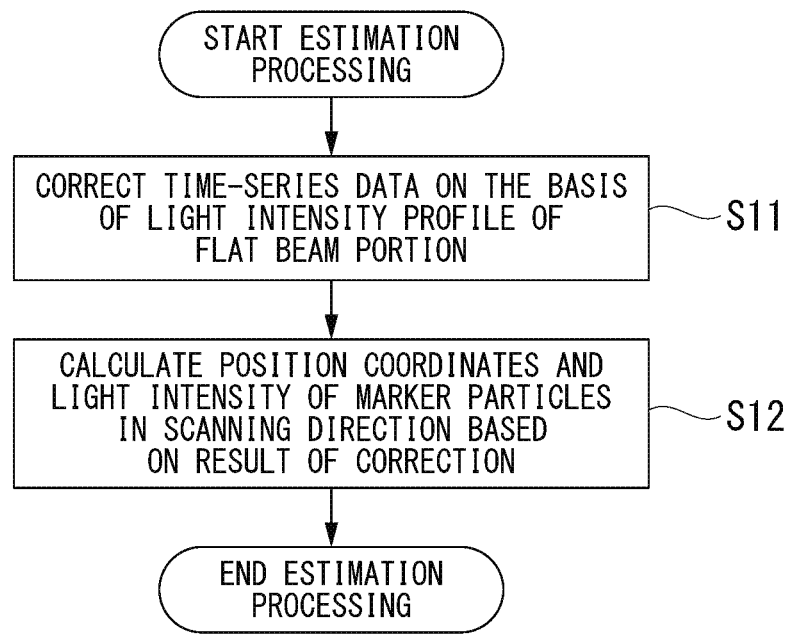
FIG. 8 is a flowchart which shows an example of estimation processing in the optical analysis method according to the first embodiment of the present invention.
Figure 9:
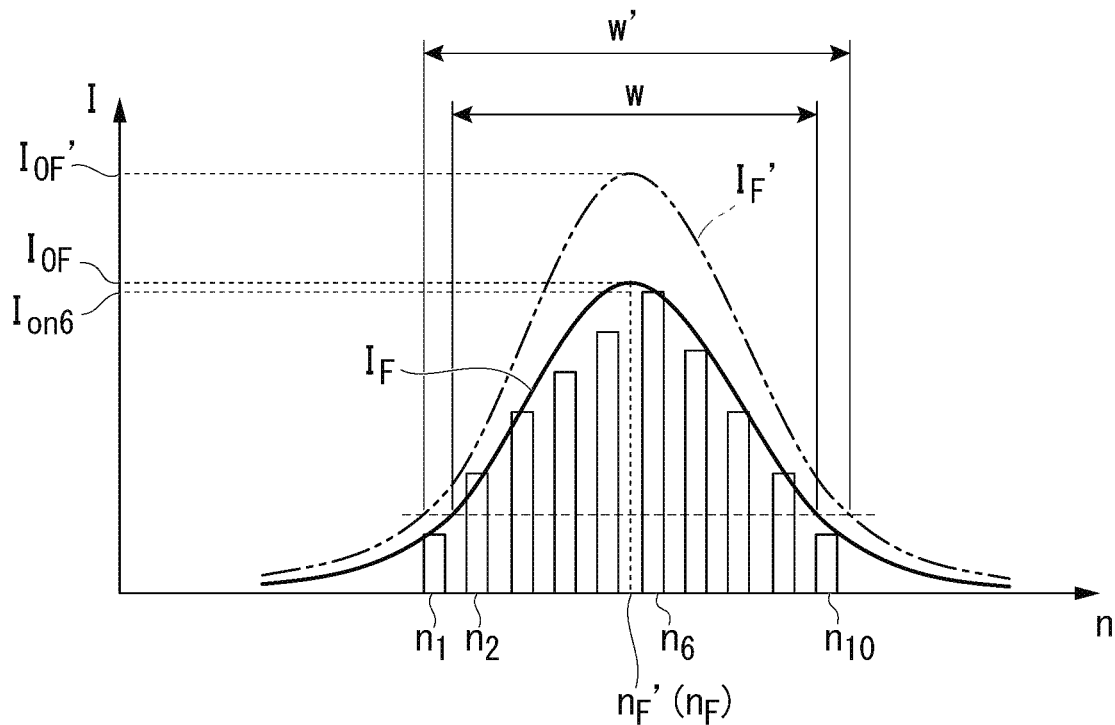
FIG. 9 is a schematic graph which shows an example of the estimation processing in the optical analysis device according to the first embodiment of the present invention.
Figure 10:
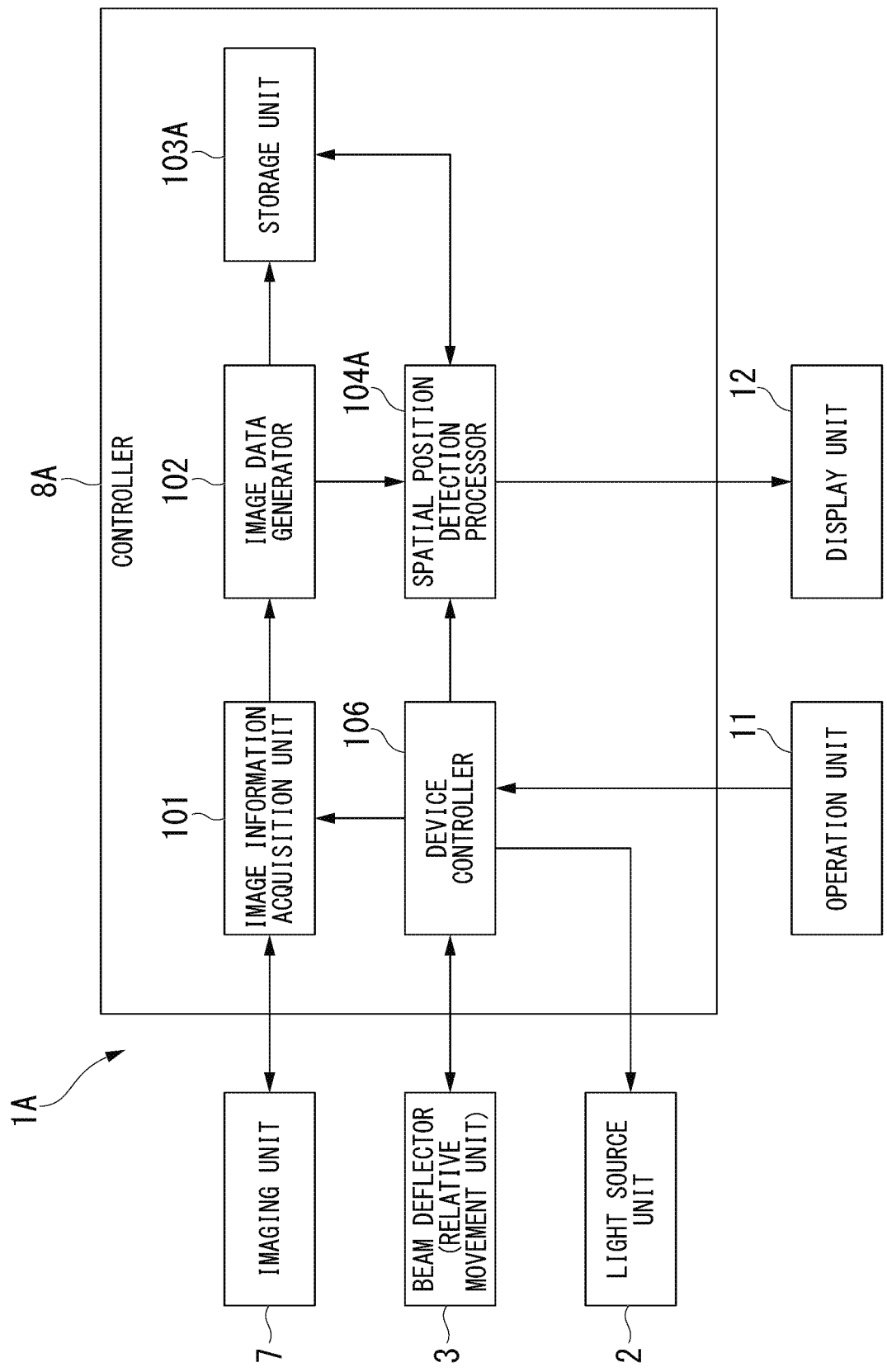
FIG. 10 is a block diagram which shows a configuration of a controller in an optical analysis device according to a second embodiment of the present invention.

FIG. 6 is a flowchart which shows an operation example of the optical analysis device according to the first embodiment of the present invention. FIG. 7 is a schematic diagram and a graph which show an example of a time-series luminance distribution in an optical analysis method according to the first embodiment of the present invention. Here, a figure of (a) in FIG. 7 shows the schematic diagram and a figure of (b) in FIG. 7 shows the graph. FIG. 8 is a flowchart which shows an example of estimation processing in the optical analysis method according to the first embodiment of the present invention. FIG. 9 is a schematic graph which shows an example of the estimation processing in the optical analysis device according to the first embodiment of the present invention. FIG. 10 is a schematic graph which shows an example of fitting processing of time-series data in the optical analysis device according to the first embodiment of the present invention.

The optical analysis method of the present embodiment can be performed using the optical analysis device 1. An analysis performed using the optical analysis device 1 is performed according to steps S1 to S8 shown in FIG. 6 executed along a flow shown in FIG. 6.

In step S1, light intensity profile data (light intensity distribution information) of the flat beam portion LF is created.

The light intensity profile data is not particularly limited as long as it is data which can correct a measurement value of the light intensity of emitted light on the basis of a light intensity distribution in a beam cross-section passing through a position (x,y) in the flat beam portion LF.

For example, when the flat beam portion LF can be approximated by a Gaussian beam, the light intensity distribution is determined according to parameters including a peak intensity $I_0$ at a beam waist on the optical axis, beam waist diameters $w_{x0}$, $w_{y0}$, and the like. For this reason, the light intensity profile is given by a Gaussian distribution function $I_g$ ($\xi,\eta,\zeta$) including these parameters. Here. $\xi$, $\eta$, and $\zeta$ are coordinates of a $\xi\eta\zeta$ coordinate system that is a local coordinate system fixed on the flat beam portion LF. A $\xi$ axis, an $\eta$ axis, and $\zeta$ a axis are coordinate axes parallel to the X axis, the Y axis, and the Z axis, respectively, and an origin is a beam center at the beam waist of the flat beam portion LF. In operation processing performed by the controller 8, when necessary, coordinate values of the XYZ coordinate system that is a fixed system are coordinate-converted into coordinate values of the $\xi\eta\zeta$ coordinate system.

The light intensity profile data may be held as a function program and may be held as a data table.

If a cross-sectional profile of a Gaussian beam in cross sections including an optical axis in both a major axis direction and a minor axis direction is given, a cross-sectional profile at a position shifted from the optical axis is easily converted from the cross-sectional profile including the optical axis.

If the flat beam portion LF cannot be approximated accurately using the Gaussian beam, the light intensity profile data may be configured from another function with higher approximation accuracy or a data table thereof. Furthermore, the light intensity profile data may be configured from an empirical formula or a data table according to the actual value of the light intensity distribution of the flat beam portion LF.

In the following description, for a sake of simplicity, an example of a case in which the flat beam portion LF can be accurately approximated as a Gaussian beam will be described.

When a plurality of types of light intensity profile data are stored in the storage unit 103 in advance, a measurer only needs to select the stored light intensity profile data through the operation unit 11 in step S1. The examples of the plurality of types of light intensity profile data include, for example, a case where numerical values of W1, W2, and W3 of the flat beam portion LF are different, a case where light emitting sensitivity of an excitation light with respect to the light intensity of the flat beam portion LF varies depending on the type of marker particles, and the like.

After step S1 has ended, the sample 10 is placed in the sample holding unit 5. The sample 10 is aligned such that a measurement target area falls into the scanning range of the flat beam portion LE The measurer inputs measurement conditions and the like from the operation unit 11 when necessary. When the measurement conditions are not input, the optical analysis device 1 operates under preset default conditions.

After the above measurement preparation work ends, step S2 is performed. In step S2, the scanning of the flat beam portion LF is started.

After the measurement preparation work ends, a measurer inputs an operation to start measurement from the operation unit 11.

The device controller 106 sends a control signal to start lighting of the light beam L1 to the light source unit 2. At this time, the control signal may include, when necessary, a control signal for selecting a wavelength, a beam diameter, and the like of the light beam L1.

The device controller 106 sends a control signal to start oscillation after sending information on operation conditions such as the oscillation operation condition and the oscillation frequency to the drive unit 3*b* of the beam deflector 3 in accordance with a measurement condition when necessary.

The beam deflector 3 starts oscillation of the deflection surface 3*a* on the basis of a control signal from the device controller 106.

As described above, step S2 ends.

When step S2 ends, as described above, the light beam L1 is deflected by the deflection surface 3*a* and is incident on the beam shaping unit 4 as the light beam L2. The light beam L2 is converged by the beam shaping unit 4 and emitted into the sample 10 as a light beam L3. The flat beam portion LF is formed in the vicinity of a beam waist of the light beam L3.

The flat beam portion LF moves in a reciprocate manner in the Z axis direction in accordance with the oscillation of the deflection surface 3*a*.

A movement speed V of the flat beam portion LF is determined according to a change in an angular speed of an oscillation motion of the deflection surface 3*a*. When the beam shaping unit 4 is a cylindrical lens, a half angle of view $\theta$ of the light beam L2 and an image height H of the beam waist have a relationship of H==f·tan $\theta$, where the focal length of the beam shaping unit 4 is f. The movement speed V(z) at each place in the Z axis direction corresponds to the change in the angular speed of the deflection surface 3*a*. The movement speed V(z) may be an inconstant speed in the measurement area, but is more preferably a constant speed.

In the following description, for a sake of simplicity, the movement speed V(z) of the measurement area will be described to have a constant value V.

After step S2, step S3 is performed. The light intensity distribution data is generated in step S3.

When the beam deflector 3 is driven, the beam deflector 3 sends a position output signal to the device controller 106. The device controller 106 is capable of analyzing an oscillation position of the deflection surface 3*a* on the basis of the position output signal. There is a one-to-one correspondence between the oscillation position of the deflection surface 3*a* and a position of the flat beam portion LF in the Z axis direction. The device controller 106 ascertains the position of the flat beam portion LF in the Z axis direction in real time on the basis of the position output signal received from the beam deflector 3.

The device controller 106 sends a control signal that causes the image information acquisition unit 101 to acquire an image with an appropriate time interval $\Delta t$ between a time ts and a time te, for example. Here, the time ts is a time at which the flat beam portion LF starts scanning from a lowest end of the measurement area in the Z axis direction. The time te is a time at which the flat beam portion LF ends scanning to a highest end of the measurement area in the Z axis direction.

The time interval $\Delta t$ is a time interval which can be converted into a movement distance Zs from the lowest end to the highest end of the measurement area of the flat beam portion LF, and can divide a length of the minor axis beam diameter W2 by the number of divisions N required for measurement. Furthermore, the time interval Δt is a size that can be imaged according to a frame rate of the imaging unit 7.

For example, if the movement speed of the flat beam portion LF is set to V, the movement amount Δz of the flat beam portion LF in the time interval Δt is Δz=V·Δt. For this reason, Δt=Zs/(V·N).

If the number of divisions N is too small, the positions of marker particles in the Z axis direction cannot be detected accurately. If the number of divisions N is too large, time required for measurement and operation processing required for measurement will increase too much.

For example, the number of divisions N may be 10 or more and 30 or less. It is more preferable that the number of divisions N be 10 or more and 20 or less.

The image information acquisition unit 101 acquires image information of the imaging unit 7 for each time interval Δt from a time ts on the basis of a control signal sent from the device controller 106.

The image information acquired by the imaging unit 7 is an image formed on the imaging surface 7a. The emitted light from marker particles forms an image on the imaging surface 7a by the telecentric optical system 6. The telecentric optical system 6 includes an aperture 6C at a position optically conjugated with the focal point of the objective lens 6A. The noise light incident on the objective lens 6A from a position away from marker particles to some extent is blocked by the aperture 6C. For this reason, a light image formed on the image surface of the telecentric optical system 6 is formed at a position optically conjugated with a light emitting position on an object surface with a light intensity substantially corresponding to the amount of emitted light on the object surface.

However, when a noise light is incident onto a focal region of the objective lens 6A, the noise light also reaches the image surface. For this reason, not all of the noise light is blocked.

The image information acquisition unit 101 sends the acquired image information to the image data generator 102. The image data generator 102 generates image data representing a light intensity distribution in an imaging range according to the sent image information. The image data has a luminance substantially corresponding to a light amount of emitted light on the object surface at a pixel position corresponding to the light emitting position.

The image data generator 102 causes the storage unit 103 to store each image data in association with acquisition time. The image data generator 102 stores, for example, image data acquired at a time t=ts+Δt·(n−1) in an array like $G_n(i_x, i_y)$. Here, n is an integer of 1 or more and K (where K>N+1) or less. An index n represents an order in a time-series measurement for each image data, and represents the position of the flat beam portion LF in the Z axis direction when image data is acquired. A set of indices $i_x$ and $i_y$ represents a pixel position on the imaging surface 7a corresponding to a rectangular area centering around a position (x,y) of the measurement area.

When all image data $Gn(i_x,i_y)$(n=1, . . . , K) are generated, the image data generator 102 notifies the spatial position detection processor 104 that all image data $Gn(i_x,i_y)$ are generated.

As described above, step S3 ends.

The device controller 106 sends a control signal to start spatial position detection processing to the spatial position detection processor 104 after a time te at which scanning of the flat beam portion LF in the measurement area ends.

The spatial position detection processor 104 performs spatial position detection processing by performing steps S4 to S7 in this order after notification indicating step S3 has ended is received from the image data generator 102.

In step S4, position coordinates of the passing positions of the marker particles are calculated.

The spatial position detection processor 104 reads $G_n(i_x, i_y)$ from the storage unit 103. The spatial position detection processor 104 calculates position coordinates of the passing positions of the marker particles using $G_n(i_x,i_y)$. Here, the passing positions of the marker particles mean positions on the XY plane of the marker particles passing through the flat beam portion LF according to the scanning of the flat beam portion LF in the present embodiment.

When the movement speed V of the flat beam portion LF is sufficiently faster than the movement speed of marker particles in the sample solution S, while the flat beam portion LF passes through the marker particles, the marker particles are substantially stopped. In this case, there is a high probability that the marker particles are present at a position at which high luminance data appears serially at a certain position of a plurality of image data. On the other hand, a light emitting position of emitted light serving as a noise component is not constant like the marker particles.

For this reason, for example, the passing positions of the marker particles are determined by examining a luminance distribution of a plurality of $G_n(i_x,i_y)$, where n varies sequentially, with an attention on a pixel at a certain position $(i_x,i_y)$.

Before a specific calculation method is described, the luminance distribution described above will be described.

Figures of (a) and (b) in FIG. 7 schematically show a relationship between the scanning of the flat beam portion LF and a luminance value acquired at a predetermined pixel. In the present embodiment, the marker particles are stopped and the flat beam portion LF moves in the positive direction of the Z axis direction. However, for simplification of illustration, In the figure of (a), it is drawn that the flat beam portion LF is stopped and the marker particles move in the negative direction (a direction from a top to a bottom in the figure of (a)) of the Z axis direction. The figure of (b) is a bar graph which schematically represents a luminance of image data corresponding to relative movement positions of the marker particles in the figure of (a). In the figure of (b), $z_1$ to $z_{10}$ represent movement positions in the Z axis direction corresponding to the figure of (a). The lengths of the bar graph represents luminance $I_1$ to $I_{10}$.

As shown in the figure of (a) in FIG. 7, for example, a marker particle M positioned at $z_1$ is positioned outside a range of a beam diameter of the flat beam portion LF at a start of scanning. As the scanning progresses, the marker particle M moves relatively downward in the figure of (a), and enters into an area in the beam diameter of the flat beam portion LF in which the light intensity gradually increases.

Since a light emission amount of the marker particle M depends on a light amount of an excitation light, the marker particle emits the excitation light reflecting the light intensity distribution of the flat beam portion LF at the passing position. For this reason, as shown in the figure of (b), a luminance $I_1$ of image data at the position $z_1$ is very low. A reason why the light emission amount $I_1$ is not 0 is that a laser light has a certain level of light intensity even outside the beam diameter.

As a relative movement of the marker particle M progresses and approaches a center (the optical axis O3) of the light intensity distribution of the flat beam portion LF, like, for example, a position $z_2$ to a position $z_4$, the luminance increases like $I_2$ to $I_4$. The light emission amount has a maximum value $I_6$ at a position $z_6$ that is closest to the center (optical axis O3) of the light intensity distribution of the flat beam portion LF. When the relative movement progresses further, the light emission amount gradually decreases, and the luminance $I_{10}$ decreases to the same extent as the luminance $I_1$ at a position $z_{10}$ at which the marker particle M is out of the range of the beam diameter of the flat beam portion LF.

An envelope curve of the bar graph in the figure of (b) is a bell-shaped curve. This is because the light intensity distribution of the flat beam portion LF is the Gaussian distribution.

In this manner, in a pixel at the position $(i_x, i_y)$ corresponding to the passing positions of the marker particles, a change is shown in which a plurality of $G_n(i_x, i_y)$, where n varies sequentially, gradually increase and gradually decrease in accordance with a light intensity profile in a cross-section parallel to the ZX plane at the position (x,y) of the flat beam portion LF. On the other hand, although not particularly shown, a luminance distribution caused by a noise light has a sporadic distribution or a distribution different from the light intensity profile in the cross-section parallel to the ZX plane of the flat beam portion LF.

Therefore, it is possible to determine whether there is a luminance distribution caused by marker particles according to the shape of the luminance distribution of the plurality of $G_n(i_x, i_y)$, where n varies sequentially.

A specific determination method performed by the spatial position detection processor 104 is not particularly limited.

In the following description, an example of the determination method will be described.

For example, the spatial position detection processor 104 generates luminance distribution data $g(i_x, i_y)(n)$ in which $Gn(i_x, i_y)$ of pixels at the position $(i_x, i_y)$ are arranged in ascending order of n.

The spatial position detection processor 104 obtains moving averages of the luminance distribution data $g_{(ix,iy)}(n)$ in ascending order of n, and compares each of the moving averages with a threshold value, thereby determining whether the pixel $(i_x, i_y)$ corresponds to the passing position.

As the threshold value, an appropriate value larger than a luminance level of the noise light and less than a luminance corresponding to the peak light emission amount when the marker particles move to the center of the flat beam portion LF is used.

In step S4, it does not matter whether there are other marker particles at the passing positions and the positions of the marker particles in the Z axis direction. For this reason, the spatial position detection processor 104 can stop obtaining the moving averages of $g(i_x, i_y)(n)$ as soon as the threshold value is exceeded, and execute similar determination processing for other pixels.

When the determination described above is performed on all pixels and the passing positions $P_j(i_x, i_y)$ (where j is an integer of 1 or more and $N_p$ or less) of all the marker particles are extracted, step S4 ends. Here, $N_p$ is the total number of extracted passing positions $P_j$.

In step S4, the position $(i_x, i_y)$ on image data is obtained as the position coordinates of the passing positions of the marker particles. In step S4, it is not necessary to convert the position $(i_x, i_y)$ into real coordinates (x,y).

A determination method in which the marker particles somewhat move while the flat beam portion LF is scanned may be used to improve detection accuracy of the passing positions of the marker particles.

For example, in step S4, the passing positions may be extracted on the basis of a luminance distribution including areas of surrounding pixels of a specific pixel. Specifically, the spatial position detection processor 104 calculates a sum $S_n(i_x, i_y)$ of pixel data of a range of 3×3 pixels or 5×5 pixels, centering around a pixel at the position $(i_x, i_y)$, instead of the luminance distribution data $g(i_x, i_y)(n)$ of a single pixel at the position $(i_x, i_y)$. The spatial position detection processor 104 arranges the sum $S_n(i_x, i_y)$ in ascending order of n, and generates luminance distribution data $s(i_x, i_y)(n)$.

Thereafter, moving averages of the luminance distribution data $s_{(ix,iy)}(n)$ is obtained in ascending order of n, and the passing positions are determined in the same manner as described above. The spatial position detection processor 104 causes the storage unit 103 to store the luminance distribution data $s_{(ix,iy)}(n)$ when it is determined that at least the position $(i_x, i_y)$ is the passing position.

After step S4, step S5 is performed. In step S5, time-series data of light emission intensity at the passing positions of the marker particles is generated.

The spatial position detection processor 104 uses a luminance value of $G_n(i_x, i_y)$ itself as a light emission intensity when the determination of a passing position is performed at a single pixel in step S4. Specifically, the spatial position detection processor 104 extracts $G_n(i_x, i_y)$ at each passing position $P_j(i_x, i_y)$ and arranges them in ascending order of n, thereby generating time-series data $I_j(i_x, i_y)$ (here, j=1, . . . , $N_p$). The spatial position detection processor 104 causes the storage unit 103 to store the time-series data $I_j(i_x, i_y)$.

In step S4, if the determination of a passing position is performed even on image data of an area adjacent to the pixel at the position $(i_x, i_y)$, the luminance distribution data $s_{(ix,iy)}(n)$ corresponding to the passing position $P_j(i_x, i_y)$ is used.

The spatial position detection processor 104 reads the luminance distribution data $s_{(ix,iy)}(n)$ from the storage unit 103 and generates the time-series data $I_j(i_x, i_y)$ (here, j=1, . . . , $N_p$).

As described above, step S5 ends.

After step S5, step S6 is performed. Position coordinates of marker particles in the scanning direction and the light emission intensity of marker particles are estimated on the basis of the time-series data in step S6.

In step S6, steps S11 and S12 shown in FIG. 8 are performed in this order.

In step S11, the time-series data is corrected on the basis of the light intensity profile of the flat beam portion LF.

For example, FIG. 9 shows a part of the time-series data $I_j(i_x, i_y)$ as a bar graph. In the example shown in FIG. 9, there is a bell-shaped luminance distribution continuous between indices $n_1$ to $n_{10}$. The spatial position detection processor 104 performs fitting on the luminance distribution on the basis of a light intensity profile. In the present embodiment, as a fitting curve, a Gaussian distribution curve is used. Fitting calculation is not particularly limited. For example, a least square method or the like may be used.

The spatial position detection processor 104 calculates a fitting curve $I_F$ according to fitting.

Thereafter, the spatial position detection processor 104 standardizes the fitting curve $I_1$ to correct a decreased portion in luminance due to the light intensity profile of the flat beam portion $L_F$ in the Y axis direction. Specifically, the spatial position detection processor 104 refers to the light intensity profile and acquires a peak value $I_0$ of the light intensity of the flat beam portion $L_F$ at a coordinate x and a light intensity $I_y$ at a coordinate y in a cross-section taken in the Y axis direction including the optical axis O3.

The spatial position detection processor 104 generates a fitting curve $I_F'$ by multiplying the fitting curve $I_F$ by a correction coefficient $I_0/I_y$. As a result, a peak value $I_{0F}'$ of the fitting curve $I_F'$ is $I_{0F}'=I_{0F}\cdot(I_0/I_y)$, and a decrease in the light intensity of the flat beam portion $L_F$ due to the light intensity profile is corrected.

As described above, step S11 ends.

After step S11, step S12 is performed. In step S12, the light intensity and the position coordinates of marker particles in the scanning direction are calculated according to a result of correction in step S11.

The spatial position detection processor 104 calculates a center position $n_F'$ of the fitting curve $I_F'$, a peak value $I_{0F}'$, and a representative width w'. Here, the center position $n_F'$ is a real number.

The representative width w' is used to determine whether a range of the luminance distribution corresponds to a beam diameter of the flat beam portion LF at a passing position in the minor axis direction. For example, a width at $1/e^2$ of the peak intensity is used as the representative width w'.

The spatial position detection processor 104 determines that the luminance distribution used for fitting is caused by the light emission of marker particles when the representative width w' coincides with the minor axis beam diameter W2 within a predetermined allowance range.

In this case, the spatial position detection processor 104 converts $i_x$ and $i_y$ representing positions of the passing position $P_j(i_x,i_y)$ and the position $n_F'$ into spatial coordinates $(x_j,y_j,z_j)$ in the XYZ coordinate system. In this manner, estimation values of the spatial coordinates of marker particles at the passing position $P_j(i_x,i_y)$ are calculated.

The spatial position detection processor 104 sets the peak value $I_{0F}'$ as a light emission intensity $I_j$ of marker particles at the passing position $P_j(i_x,i_y)$. In this manner, estimation values of the light emission intensity of marker particles at the passing position $P_j(i_x,i_y)$ are calculated.

When both the light emission intensity $I_j$ and the spatial coordinates $(x_j,y_j,z_j)$ at all passing positions $P_j(i_x,i_y)$ are calculated, the spatial position detection processor 104 causes the storage unit 103 to store the spatial coordinates $(x_j,y_j,z_j)$ and the light emission intensity $I_j$. Furthermore, it sends the spatial coordinates $(x_j,y_j,z_j)$ and the light emission intensity $I_j$ to the measurement information generator 105.

As described above, step S12 and step S6 in FIG. 6 end.

According to such estimation processing, influence of an error included in the luminance distribution data is reduced by fitting the luminance distribution. Furthermore, light emitting positions of the marker particles in the Z axis direction may be estimated with a resolution higher than the time interval Δt of the measurement.

For example, a peak luminance in the luminance distribution data of FIG. 9 is $I_{0n6}$ at $n_6$, but is shifted from each estimation value described above and is a measurement value with a larger error.

As shown in FIG. 6, step S7 is performed after step S6. In step S7, measurement information is generated according to the estimation values of the light emission intensity and the spatial position coordinates of marker particles.

The measurement information generator 105 generates measurement information on the basis of the light emission intensity $I_j$ and the spatial coordinates $(x_j,y_j,z_j)$ of marker particles. At least predetermined default measurement information is generated as the measurement information. Furthermore, if there is measurement information input from the operation unit 11 before measurement is started, measurement information in accordance with an input is generated.

The measurement information generator 105 may generate the number of marker particles as measurement information by counting the number of spatial coordinates $(x_j,y_j,z_j)$ of marker particles sent from the spatial position detection processor 104.

The measurement information generator 105 may generate the concentration of marker particles as measurement information by dividing the number of marker particles by a volume of the measurement area.

The measurement information generator 105 may generate a distance between maker particles as measurement information by calculating a distance between the marker particles from the spatial coordinates $(x_j,y_j,z_j)$ of different marker particles.

The measurement information generator 105 may group marker particles having a distance between respective marker particles equal to or less than a predetermined distance, and may calculate the number of marker particles in each group that is grouped. In this case, specific information on the type of a substance may be generated as measurement information with reference to a correspondence table between the number of marker particles and the type of a substance in the storage unit 103 in advance.

The measurement information generator 105 may calculate the estimated volume, surface shape, outer diameter, and the like of a substance to which marker particles are attached according to the spatial position coordinates of respective marker particles when respective marker particles are concentrated within a predetermined distance. The measurement information generator 105 may generate these numerical data such as the volume, surface shape, outer diameter, and the like as measurement information. Furthermore, the measurement information generator 105 may generate specific information on the type of a substance as measurement information with reference to a correspondence table between these numerical data such as the volume, the surface shape, the outer diameter, and the like and the type of a substance.

When required measurement information is generated by the measurement information generator 105, step S7 ends.

After step S7, step S8 is performed. In step S8, the measurement information generated in step S7 is output.

The measurement information generator 105 outputs the measurement information to an appropriate output destination. For example, the measurement information generator 105 may output the measurement information to the display unit 12. The display unit 12 displays measurement information converted into display information from the measurement information generator 105 as, for example, a numerical value, a character, an image, a graph, a table, or the like.

However, the output destination of the measurement information by the measurement information generator 105 is not limited to the display unit 12. For example, the measurement information generator 105 may output the measurement information to the storage unit 103. For example, when the controller 8 is connected to a communication line, the measurement information generator 105 may output the measurement information to an appropriate device on the communication line.

As described above, according to the optical analysis device 1 of the present embodiment, when the positions of marker particles are detected by light irradiation, quick measurement can be performed.

In particular, in the optical analysis device 1, emitted light from marker particles in the sample 10 is acquired in time-series by scanning the flat beam portion LF in the minor axis direction. The scanning in the minor axis direction can be performed at a high speed by the beam deflector 3. Furthermore, information on the emitted light is acquired as image information in a range of the flat beam portion LF by the imaging unit 7. For this reason, it is possible to acquire information on the light emitting position of marker particles more quickly than a case of scanning a small confocal volume in a three-dimensional manner.

Furthermore, in the optical analysis device 1, the luminance acquired by the imaging unit 7 is corrected on the basis of the light intensity profile of the flat beam portion LF. For this reason, even if a light intensity distribution varies depending on the passing positions of the marker particles as the Gaussian beam, it is possible to detect an accurate light emission intensity in a wide range.

Second Embodiment

An optical analysis device according to a second embodiment of the present invention will be described.

FIG. 10 is a block diagram which shows a configuration of a controller in the optical analysis device according to the second embodiment of the present invention.

As shown in FIG. 1, the optical analysis device 1A according to the present embodiment includes a controller 8A instead of the controller 8 in the first embodiment described above.

Hereinafter, a difference from the first embodiment described above will be mainly described.

As shown in FIG. 10, the controller 8A includes a storage unit 103A and a spatial position detection processor 104A (position detector) instead of the storage unit 103 and the spatial position detection processor 104 of the controller 8 of the first embodiment described above, and the measurement information generator 105 is configured to be deleted.

The storage unit 103A is different from the storage unit 103 in that light intensity profile data is not stored. For this reason, the spatial position detection processor 104A does not perform correction on the basis of the light intensity profile data.

Such an optical analysis device 1A is particularly suitable for a case in which there is no need to obtain the light intensity of marker particles with high accuracy, for example, a case in which it is only necessary to measure the spatial positions of marker particles.

However, in a case of using the optical analysis device 1A, when a range near the center of a beam in the Y axis direction is used as the flat beam portion LF, since the light intensity distribution is less changed, a light intensity is detected accurately to some extent without correction.

According to the optical analysis device 1A of the present embodiment, the spatial position detection processor 104A can perform the operation of the spatial position detection processor 104 which does not use the light intensity profile data of the flat beam portion LF in the first embodiment described above in the same manner as in the first embodiment. Since the optical analysis device 1A also uses the scanning of the flat beam portion LF, a quick measurement can be performed when the positions of marker particles are detected by light irradiation.

Third Embodiment

An optical analysis device according to a third embodiment of the present invention will be described.

Figure 11:
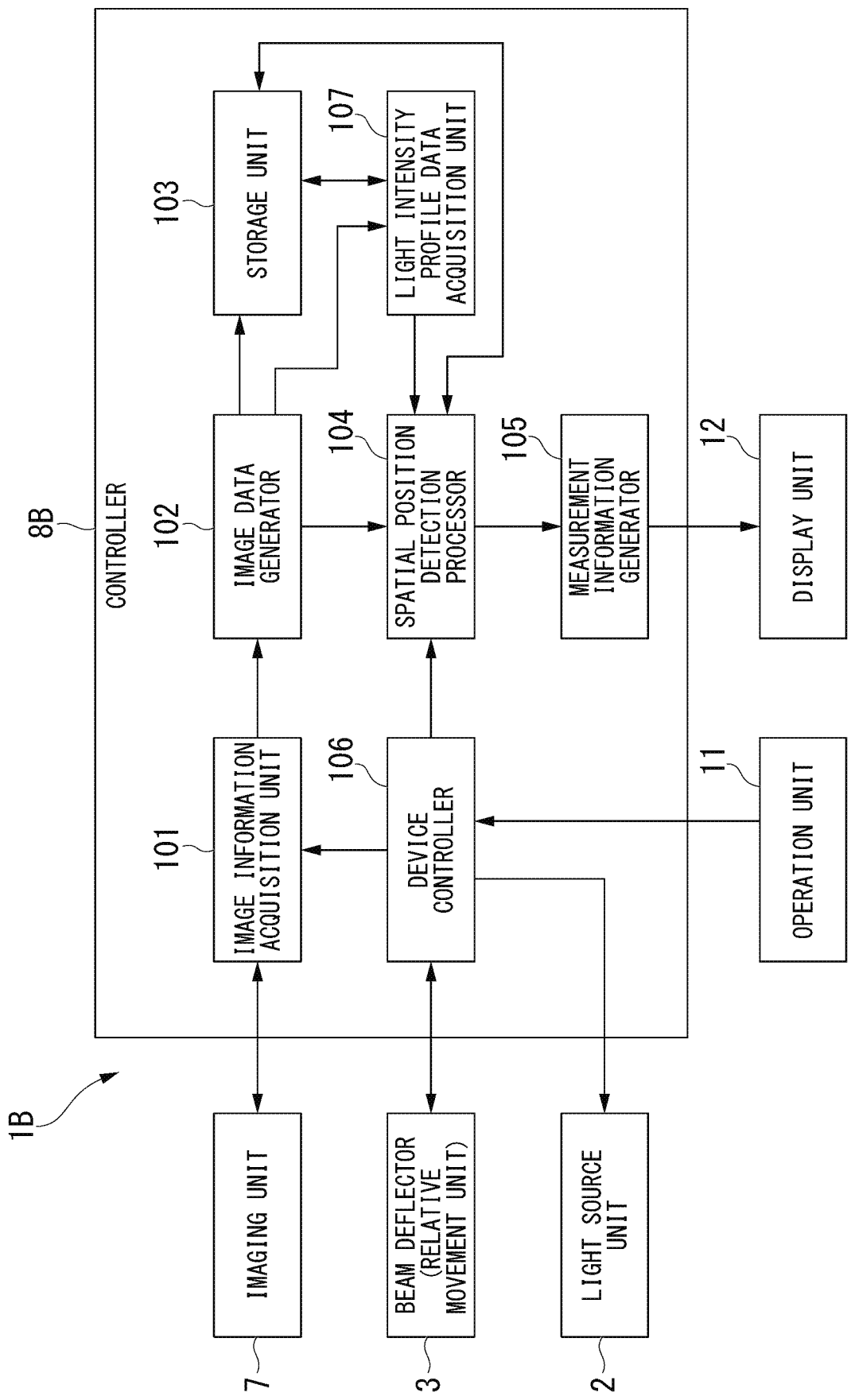
FIG. 11 is a block diagram which shows a configuration of a controller in an optical analysis device according to a third embodiment of the present invention.

FIG. 11 is a block diagram which shows a configuration of a controller in the optical analysis device according to the third embodiment of the present invention.

As shown in FIG. 11, an optical analysis device 1B according to the present embodiment includes a controller 8B instead of the controller 8 in the first embodiment described above.

Hereinafter, a difference from the first embodiment described above will be mainly described.

As shown in FIG. 11, the controller 8B is configured by a light intensity profile data acquisition unit 107 being added to the controller 8 of the first embodiment described above.

The light intensity profile data acquisition unit 107 is a device portion that acquires light intensity profile data of the flat beam portion LF.

A configuration of the light intensity profile data acquisition unit 107 is not particularly limited as long as the light intensity profile data of the flat beam portion LF can be acquired.

For example, the light intensity profile data acquisition unit 107 may be configured from an analysis device of image data acquired by the image data generator 102. In this case, standard image data of a standard sample for acquiring the light intensity profile data of the flat beam portion LF is stored in the light intensity profile data acquisition unit 107.

In the standard sample, a large number of marker particles are dispersed at predetermined positions in the measurement area. As the standard image data, image data at each scanning position when a reference sample is irradiated with the flat beam portion LF formed using a reference light source is used.

The light intensity profile data acquisition unit 107 acquires the image data of the standard sample using the light source unit 2 mounted on the optical analysis device 1B and corrects the light intensity profile data of the flat beam portion LF formed using the reference light source on the basis of a difference from the standard image data, or the like. In this manner, the light intensity profile data acquisition unit 107 generates light intensity profile data for measurement.

In order to perform an optical analysis of the sample 10 by the optical analysis device 1B, an operation of acquiring light intensity profile data using the standard sample as described above is performed in step S1 of FIG. 6.

When light intensity profile data for measurement is generated, the light intensity profile data acquisition unit 107 causes the storage unit 103 to store the light intensity profile data. Thereafter, the analysis of the sample 10 is performed in the same manner as the optical analysis device 1 of the first embodiment described above.

According to the optical analysis device 1B of the present embodiment, since an analysis can be performed in the same manner as the optical analysis device 1 of the first embodiment described above after the operation of acquiring light intensity profile data using the standard sample is performed, quick measurement can be performed when the positions of marker particles are detected by light irradiation.

Furthermore, according to the present embodiment, an actual measurement value of the light intensity profile of the flat beam portion LF generated by the optical analysis device 1B is used as the light intensity profile data. According to the optical analysis device 1B, measurement accuracy can be improved because more accurate correction is possible.

In particular, accurate measurement can be continued even if the light intensity profile of the flat beam portion LF changes due to occurrence of a secular change of the light source unit 2, the beam shaping unit 4, and the like.

In the description of each of the above embodiments, an example of including a relative movement unit in which the sample 10 is fixed and only the flat beam portion LF moves has been described. However, as the relative movement unit, a configuration in which an irradiation position of the LF is fixed and the sample 10 moves in the minor axis direction of the flat beam portion LF may be used. For example, the position of the flat beam portion LF may be fixed by configuring the sample holding unit 5 such that it can move in the Z axis direction. In this case, for example, a configuration in which the beam deflector 3 is deleted and which causes the light beam L1 to be incident in a lens optical axis of the beam shaping unit 4 can be used.

Furthermore, a relative movement unit in which both the sample 10 and the flat beam portion LF move may be configured.

In this manner, a configuration of the relative movement unit is not limited to the beam deflector 3 described above.

In the description of each of the above embodiments, an example of a case in which a cylindrical lens is used as the beam shaping unit 4 that forms a flat beam portion has been described. However, the beam shaping unit 4 is not limited to the cylindrical lens. For example, like a toroidal lens, a flat beam portion may be formed by an optical element having optical power in the major axis direction and the minor axis direction.

In the description of each of the above embodiments, an example of a case in which the measurement area of the optical analysis device is the scanning range of the flat beam portion has been described. However, a wider range of measurement may be performed by moving the sample 10 in the X axis direction or the Y axis direction and performing a plurality of times of measurements.

In the description of the third embodiment described above, an example of a case in which the light intensity profile data is acquired using a reference sample has been described. However, a light intensity profile data acquisition unit that optically is configured to measure the light intensity profile of the flat beam portion by disposing a light detection sensor in an optical path of the flat beam portion may be provided.

In the description of the first embodiment described above, an example of a case in which optical analysis is performed along the flows shown in FIGS. 6 and 8 has been described. However, operations that can be executed in parallel in each step may be performed in parallel.

Furthermore, the steps in the flows shown in FIGS. 6 and 8 which can be serially executed for each passing position of the marker particles may be serially executed for each passing position of the marker particles.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An optical analysis device comprising:
   a light source unit configured to generate a light beam causing marker particles to emit light;
   a beam shaping unit configured to form a flat beam portion with at least a portion of the light beam, wherein a cross-section of the flat beam portion has a light intensity profile with different light intensities from a center to an outside;
   a relative movement unit configured to cause the flat beam portion and a test sample including the marker particles to relatively move in a minor axis direction of the flat beam portion by moving at least one of the flat beam portion and the test sample;
   a photodetector disposed to face the flat beam portion in the minor axis direction, the photodetector being configured to detect a light intensity of emitted light in the test sample and a light emitting position of the emitted light in a plane orthogonal to the minor axis direction; and
   a position detector configured to detect spatial positions of the marker particles in the test sample based on information on a relative movement amount of the flat beam portion obtained by the relative movement unit, information on the light intensity and the light emitting position obtained by the photodetector, information on the light intensity profile in the cross-section of the flat beam portion, and a change of the light intensity at the light emitting position generated according to a relative movement of the flat beam portion, wherein the detected light intensity differs depending on a position on a minor axis of the flat beam portion through which the marker particles pass during the relative movement.

2. The optical analysis device according to claim 1, wherein the photodetector is configured to acquire image information on a basis of the emitted light, and
   the light intensity and the light emitting position are detected on a basis of the image information.

3. The optical analysis device according to claim 2, wherein the image information is a plurality of two-dimensional images that are acquired at time intervals and represent light intensity distributions along the plane, and
   wherein a single two-dimensional image is acquired on the plane for each of a plurality of relative positions of the flat beam portion and the test sample shifted in the minor-axis direction, to thereby acquire the plurality of two-dimensional images.

4. The optical analysis device according to claim 1, further comprising:
   a storage unit configured to store intensity distribution information at least of light in a major axis direction orthogonal to the minor axis direction in the flat beam portion,
   wherein the position detector is configured to correct information of the light intensity from the photodetector on a basis of the light intensity distribution information stored in the storage unit.

5. The optical analysis device according to claim 1, wherein the position detector is configured to count the number of marker particles on a basis of information of the spatial positions.

6. The optical analysis device according to claim 1, wherein the position detector is configured to measure a volume of a substance to which the marker particles are attached on a basis of information of the spatial positions.

7. The optical analysis device according to claim 1, wherein the position detector is configured to measure a distance between the plurality of marker particles on a basis of information of the spatial positions.

8. The optical analysis device according to claim 1, wherein the relative movement unit is configured to cause the flat beam portion to relatively move at a higher speed than a diffusion rate of the marker particles in the test sample.

9. An optical analysis method comprising:
irradiating, with a light beam having a flat beam portion, an inside of a test sample including marker particles caused to emit light by the light beam, wherein a cross-section of the flat beam portion has a light intensity profile with different light intensities from a center to an outside;
causing the flat beam portion to relatively move in a minor axis direction of the flat beam portion with respect to the test sample;
detecting a light intensity of the light emitted from the test sample and a light emitting position of the emitted light in a plane orthogonal to the minor axis direction during a relative movement of the flat beam portion in the minor axis direction; and
detecting spatial positions of the marker particles in the test sample based on a relative movement amount of the flat beam portion, the light intensity and the light emitting position, information on the light intensity profile in the cross-section of the flat beam portion, and a change of the light intensity at the light emitting position generated according to a relative movement of the flat beam portion, wherein the detected light intensity differs depending on a position on a minor axis of the flat beam portion through which the marker particles pass during the relative movement.

10. The optical analysis method according to claim 9, further comprising:
counting the number of the marker particles on a basis of the spatial positions.

11. The optical analysis method according to claim 9, further comprising:
measuring a volume of a substance to which the marker particles are attached on a basis of the spatial positions.

12. The optical analysis method according to claim 9, further comprising:
measuring a distance between the plurality of marker particles on a basis of the spatial positions.

13. The optical analysis method according to claim 9, further comprising:
relatively moving the flat beam portion at a higher speed than a diffusion movement speed of the marker particles in the test sample; and
generating time-series data of the light intensity based on a change of the light intensity.

14. A non-transitory computer-readable recording medium storing a program that is executable by a computer to control the computer to perform functions comprising:
acquiring light intensity distribution data in a plane viewed from a minor axis direction of a flat beam portion of a light beam, by scanning the flat beam portion in the minor axis direction in a test sample including marker particles caused to emit light by a light beam, wherein a cross-section of the flat beam portion has a light intensity profile with different light intensities from a center to an outside, and a detected light intensity differs depending on a position on a minor axis of the flat beam portion through which the marker particles pass during the relative movement;
acquiring one-dimensional time-series data with fixed position coordinates in the plane from the light intensity distribution data;
performing correction processing on the time-series data at the position coordinates based on the light intensity profile in the cross-section of the flat beam portion; and
estimating spatial positions of the marker particles according to the corrected time-series data.

15. The non-transitory computer-readable recording medium according to claim 14, further comprising:
counting the number of the marker particles on a basis of the spatial positions.

16. The non-transitory computer-readable recording medium according to claim 14, further comprising:
measuring a volume of a substance to which the marker particles are attached on a basis of the spatial positions.

17. The non-transitory computer-readable recording medium according to claim 14, further comprising:
measuring a distance between the plurality of marker particles on a basis of the spatial positions.

18. The optical analysis device according to claim 1, wherein the light intensity profile is a light intensity distribution approximated by a Gaussian beam.

19. The optical analysis device according to claim 1, wherein:
the photodetector is configured to acquire a plurality of images at predetermined time intervals, based on the emitted light; and
the position detector is configured to generate time-series data of the light intensity by arranging the plurality of the images in a time-series manner.

20. The optical analysis method according to claim 9, wherein the light intensity profile is a light intensity distribution approximated by a Gaussian beam.

* * * * *